United States Patent
Inomoto et al.

(10) Patent No.: US 9,890,703 B2
(45) Date of Patent: Feb. 13, 2018

(54) FIXING STRUCTURE FOR EXHAUST GAS SENSOR OF INTERNAL COMBUSTION ENGINE

(71) Applicant: HONDA MOTOR CO., LTD., Minato-ku, Tokyo (JP)

(72) Inventors: Yutaka Inomoto, Wako (JP); Hitoshi Yokotani, Wako (JP); Kosuke Sakasai, Wako (JP); Satoshi Okayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 15/023,319

(22) PCT Filed: May 20, 2014

(86) PCT No.: PCT/JP2014/063350
§ 371 (c)(1),
(2) Date: Mar. 18, 2016

(87) PCT Pub. No.: WO2015/040888
PCT Pub. Date: Mar. 26, 2015

(65) Prior Publication Data
US 2016/0245169 A1    Aug. 25, 2016

(30) Foreign Application Priority Data
Sep. 19, 2013    (JP) .................................. 2013-194047

(51) Int. Cl.
*F02B 77/08*    (2006.01)
*F02B 61/02*    (2006.01)
(Continued)

(52) U.S. Cl.
CPC ............ *F02B 77/086* (2013.01); *B62K 11/10* (2013.01); *F01N 13/001* (2013.01);
(Continued)

(58) Field of Classification Search
CPC ............ F02D 41/1456; F02D 41/1448; F02B 77/086; F02F 2001/4278
See application file for complete search history.

(56) References Cited

U.S. PATENT DOCUMENTS 5,109,084 A * 4/1992 Lee .......................... C08F 10/00
502/103
6,739,177 B2 * 5/2004 Sato .................... F02D 41/0037
73/114.71
(Continued)

FOREIGN PATENT DOCUMENTS

JP    H10-89055 A    4/1998
JP    H11-200913 A    7/1999
(Continued)

OTHER PUBLICATIONS

Supplementary European Search Report, dated Mar. 29, 2017, issued in the corresponding EP Patent Application 14 84 5742.

*Primary Examiner* — Long T Tran
(74) *Attorney, Agent, or Firm* — Carrier Blackman & Associates, P.C.; Joseph P. Carrier; William D. Blackman

(57) ABSTRACT

A cylinder head of an internal combustion engine includes a first exhaust port section having an upstream inlet opened and closed by a first exhaust valve, a second exhaust port section having an upstream inlet opened and closed by a second exhaust valve, and a collective exhaust port section into which the first and second exhaust port sections merge at downstream ends thereof. In a fixing structure for an exhaust gas sensor, the sensor is fixed to the collective exhaust port section with its sensing tip in the port section. An exhaust gas guide part is formed, at a position upstream of the sensor, on an internal wall of the port section, opposite the internal wall to which the sensor is fixed, so as to bulge out to guide exhaust gas toward the sensor, whereby exhaust (Continued)

gas is effectively intermixed and directed to the sensor with resultant increased sensing accuracy.

17 Claims, 11 Drawing Sheets

(51) Int. Cl.
    *B62K 11/10*      (2006.01)
    *F02F 1/42*      (2006.01)
    *F01N 13/00*      (2010.01)
    *F02F 1/24*      (2006.01)

(52) U.S. Cl.
    CPC ............ *F01N 13/008* (2013.01); *F02B 61/02* (2013.01); *F02F 1/4264* (2013.01); *F01N 2240/20* (2013.01); *F01N 2590/04* (2013.01); *F02F 1/24* (2013.01)

(56) References Cited

U.S. PATENT DOCUMENTS

| | | | | |
|---|---|---|---|---|
| 6,968,825 B2* | 11/2005 | Hitomi | .................... | F01L 1/053 123/406.11 |
| 7,365,587 B2* | 4/2008 | Ramaraju | .............. | H03K 3/012 327/112 |
| 8,087,230 B2* | 1/2012 | Kikuchi | .................... | F01N 3/10 60/276 |
| 8,109,084 B2* | 2/2012 | Morita | .................... | F01N 13/08 181/249 |
| 8,127,540 B2* | 3/2012 | Harada | .................... | F01N 1/08 181/249 |
| 8,365,587 B2* | 2/2013 | Suetsugu | ............ | G01M 15/104 73/114.72 |
| 8,573,042 B2* | 11/2013 | Suetsugu | ............ | G01M 15/104 73/114.72 |
| 2002/0023436 A1 | 2/2002 | Akiwa et al. | | |
| 2008/0110155 A1* | 5/2008 | Harada | .................... | F01N 1/08 60/276 |
| 2011/0113870 A1* | 5/2011 | Suetsugu | ............ | G01M 15/104 73/114.72 |
| 2012/0128409 A1* | 5/2012 | Inayama | ............... | F01N 13/008 403/288 |
| 2013/0074478 A1* | 3/2013 | Yamaguchi | ............. | F01N 13/10 60/276 |

FOREIGN PATENT DOCUMENTS

| | | |
|---|---|---|
| JP | 2007-247560 A | 9/2007 |
| JP | 2011-208586 A | 10/2011 |
| JP | 2012-102662 A | 5/2012 |

* cited by examiner

FIXING STRUCTURE FOR EXHAUST GAS SENSOR OF INTERNAL COMBUSTION ENGINE

TECHNICAL FIELD

The present invention relates to a fixing structure for an exhaust gas sensor of an internal combustion engine with a cylinder head having two exhaust port sections and a collective exhaust port section into which exhaust gas currents in the two exhaust port sections flow in such a manner to improve the sensing accuracy of the exhaust gas sensor.

BACKGROUND ART

A fixing structure for an exhaust gas sensor of an internal combustion engine is known in which an exhaust gas sensor in the form of a heater-less oxygen sensor is installed in an exhaust port in the cylinder head of the engine, with a sensing tip of the sensor positioned in the exhaust port, as disclosed in Patent Document 1, for example.

The structure disclosed in Patent Document 1 includes an engine cylinder head in which a single exhaust port and a single exhaust valve for the exhaust port are provided. To attain an improved output performance of the engine, an engine cylinder head is known in which the exhaust port system includes two upstream exhaust port sections opened and closed by two exhaust valves, respectively, and a single downstream collective exhaust port section into which the two exhaust port sections merge.

In case the exhaust gas sensor is installed in such a cylinder head, the exhaust gas sensor is naturally installed such that the sensing tip of the sensor is located in the collective exhaust port section. In such a case, it is possible that exhaust gas currents from the two upstream exhaust port sections flow onto the exhaust gas sensor in the downstream collective exhaust port section without being sufficiently intermixed. If so, it is possible that the sensing accuracy of the exhaust gas sensor is poor.

For this reason, how the exhaust gas sensor is installed and fixed influences on attaining a good sensing accuracy.

PRIOR ART DOCUMENT

Patent Document

Patent Document 1: JP 2012-102662 A (FIGS. 3-9)

DISCLOSURE OF THE INVENTION

Problem to be Solved by the Invention

The present invention is made in view of the foregoing, and the underlying object of the invention is to provide a fixing structure for an exhaust gas sensor of an internal combustion engine with a cylinder head having two exhaust port sections and a downstream collective exhaust port section into which exhaust gas currents in the two exhaust port sections flow, wherein the exhaust gas is conducted onto the exhaust gas sensor in a well-intermixed state in a manner to improve the sensing accuracy of the exhaust gas sensor.

Means for Solving the Problem

To solve the above underlying problem, the present invention provides a fixing structure for an exhaust gas sensor of an internal combustion engine, wherein the engine has a cylinder head formed with a first exhaust port section having an upstream inlet opened and closed by a first exhaust valve, a second exhaust port section having an upstream inlet opened and closed by a second exhaust valve, and a single collective exhaust port section into which the first and second exhaust port sections merge at downstream ends thereof, and the collective exhaust port section has an exhaust pipe connecting portion at a downstream end thereof; and wherein the cylinder head has an exhaust gas sensor fixed to an inner wall of the collective exhaust port section, with a sensing tip of the sensor positioned in the collective exhaust port section; characterized in that: the collective exhaust port section has a second inner wall opposite to the first-mentioned inner wall to which the exhaust gas sensor is fixed, and the second inner wall is formed thereon, in an upstream region relative to the exhaust gas sensor, with an exhaust gas guide part bulging out on the second inner wall to guide exhaust gas toward the exhaust gas sensor.

In a preferred embodiment of the invention, the exhaust gas sensor is at a position offset toward one of the first-mentioned exhaust port section and the second exhaust port section with respect to a passage centerline of the collective exhaust port section, and the exhaust gas guide part is at a position opposite the exhaust gas sensor with respect to the passage centerline.

In a further preferred embodiment of the invention, the exhaust gas guide part is formed on the second inner wall of the collective exhaust port section to bulge in a shape to approach the exhaust gas sensor from an upstream side to a downstream side, the exhaust gas guide part has a maximum bulging portion bulging out toward the exhaust gas sensor, and the collective exhaust port section has an upstream end positioned upstream of the maximum bulging portion.

In a further preferred embodiment of the invention, the exhaust gas sensor is so positioned that the sensing tip thereof is on a first imaginary line passing through a cylinder axis of the engine and through a passage center corresponding to the upstream end of the collective exhaust port section.

Preferably, the first-mentioned inner wall of the collective exhaust port section, on the side of the exhaust gas sensor, extends from an upstream side to a downstream side to so slope as to approach the first imaginary line passing through the engine cylinder axis and the passage center corresponding to the upstream end of the collective exhaust port section.

According to a preferred embodiment of the invention, the second inner wall of the collective exhaust port section, on the opposite side of the exhaust gas sensor, has a downstream portion extending downstream of the maximum bulging portion of the guide part, and the downstream portion is shaped to slope away from the first imaginary line.

According to another preferred embodiment of the invention, the first exhaust port section, the second exhaust port section and the collective exhaust port section are formed in an arcuate shape, as viewed in a transverse direction of the engine, and extend from the first and second upstream inlets, facing rearward of the engine, to the downstream end of the collective exhaust port section facing downward of the engine, and the exhaust gas sensor is fixed in an exhaust gas sensor fitting hole, which is located at a position offset in a front direction of the engine relative to the passage centerline of the collective exhaust port section.

According to a further preferred embodiment of the invention, the engine is for mounting on a saddle-type vehicle, the first exhaust port section and the second exhaust port section are disposed in side-by-side arrangement in a transverse direction of the vehicle, and an axis of the exhaust pipe connecting portion is at a position shifted in a transverse direction of the vehicle relative to the first imaginary line due to the sloping first-mentioned inner wall of the collective exhaust port section.

According to a still further preferred embodiment of the invention, the first inner wall of the collective exhaust port section, on the side of the exhaust gas sensor, is formed with an exhaust gas arresting groove extending along the passage centerline of the collective exhaust port section, in an area opposite the maximum bulging portion of the guide part, and the exhaust gas sensor fitting hole for the sensor is located at a position immediately downstream of the exhaust gas arresting groove.

Effect of the Invention

According to the fixing structure for an exhaust gas sensor of an internal combustion engine, the collective exhaust port section forming the downstream passage of the first and second exhaust port sections has the exhaust gas sensor fixed to an inner wall of the collective exhaust port section, and the exhaust gas guide part bulges out on an inner wall opposite the exhaust gas sensor and in an upstream region relative to the exhaust gas sensor, in a manner to guide exhaust gas onto the exhaust gas sensor. Therefore, even in case one of the first and second exhaust port sections is located far from the exhaust gas sensor, the exhaust gas guide part functions to guide exhaust gas current in the far-side exhaust port section onto the exhaust gas sensor, so that exhaust gas currents in both the first and second exhaust port sections are caused to be intermixed in the region of, or in an upstream region of the exhaust gas sensor, to be guided onto the exhaust gas sensor with resultant improved sensing accuracy and with resultant improved freedom of determining the fixing position of the exhaust gas sensor.

According to a preferred form of the invention, the exhaust gas sensor is at a position offset toward one of the first and second exhaust port sections with respect to a passage centerline of the collective exhaust port section. In this preferred form, the exhaust gas current from the other of the first and second exhaust port sections, which is more remote from the one exhaust port section, is caused to be guided onto the exhaust gas sensor by the function of the exhaust gas guide part with resultant improved sensing accuracy.

According to a further preferred form of the invention, the upstream end of the collective exhaust port section is located upstream of the maximum bulging portion of the exhaust gas guide part. This arrangement enables maintaining a required passage area of the collective exhaust port section in the region of the maximum bulging portion, thus reducing flow resistance.

According to a still further preferred form of the invention, in which the sensing tip of the sensor is at a position determined, exhaust gas currents that have passed through the first and second exhaust port sections can be guided effectively onto the exhaust gas sensor.

According to a preferred form of the invention, in which the first inner wall slopes in a specific configuration, even in case the exhaust gas sensor is positioned nearer to one of the first and second exhaust port sections, the exhaust gas sensor can be prevented from being far from the other exhaust port section.

According to a further preferred form of the invention, in which a downstream portion of the second inner wall slopes in a specific configuration, the downstream portion slopes away from the first imaginary line, i.e. away from the exhaust gas sensor. In other words, the second inner wall slopes in accordance with the slope of the first inner wall, whereby a required cross-sectional area of the exhaust port passage area can be maintained.

According to a further preferred form of the invention, the collective exhaust port section is shaped in an arcuate shape and the exhaust gas sensor is fixed in an exhaust gas sensor fitting hole located offset in a front direction of the engine from the passage centerline of the collective exhaust port section, i.e. in a radially outer region of the arcuate shape. This arrangement ensures the exhaust gas sensor to detect exhaust gas in an area in which exhaust gas flows fast without being stagnant, whereby the exhaust gas sensor can detect exhaust gas with improved sensing accuracy.

According to another preferred form of the invention, the axis of the exhaust pipe connecting portion is shifted in a transverse direction of the vehicle relative to the first imaginary line, and the exhaust gas sensor is on the opposite side of the shift. This configuration and arrangement suppresses outward protrusion of the exhaust gas sensor in the vehicle transverse direction and provides an exhaust gas sensor fixing structure suitable for saddle-type vehicles.

According to a further preferred form of the invention, in which the exhaust gas arresting groove is provided, the guide part operates to collect exhaust gas currents in both the first and second exhaust gas port sections into the exhaust gas arresting groove, so that the exhaust gas currents can be intermixed more effectively than in case without the exhaust gas arresting groove, with resultant improved sensing accuracy of the exhaust gas sensor.

BEST MODE FOR CARRYING OUT THE INVENTION

Figure 1:
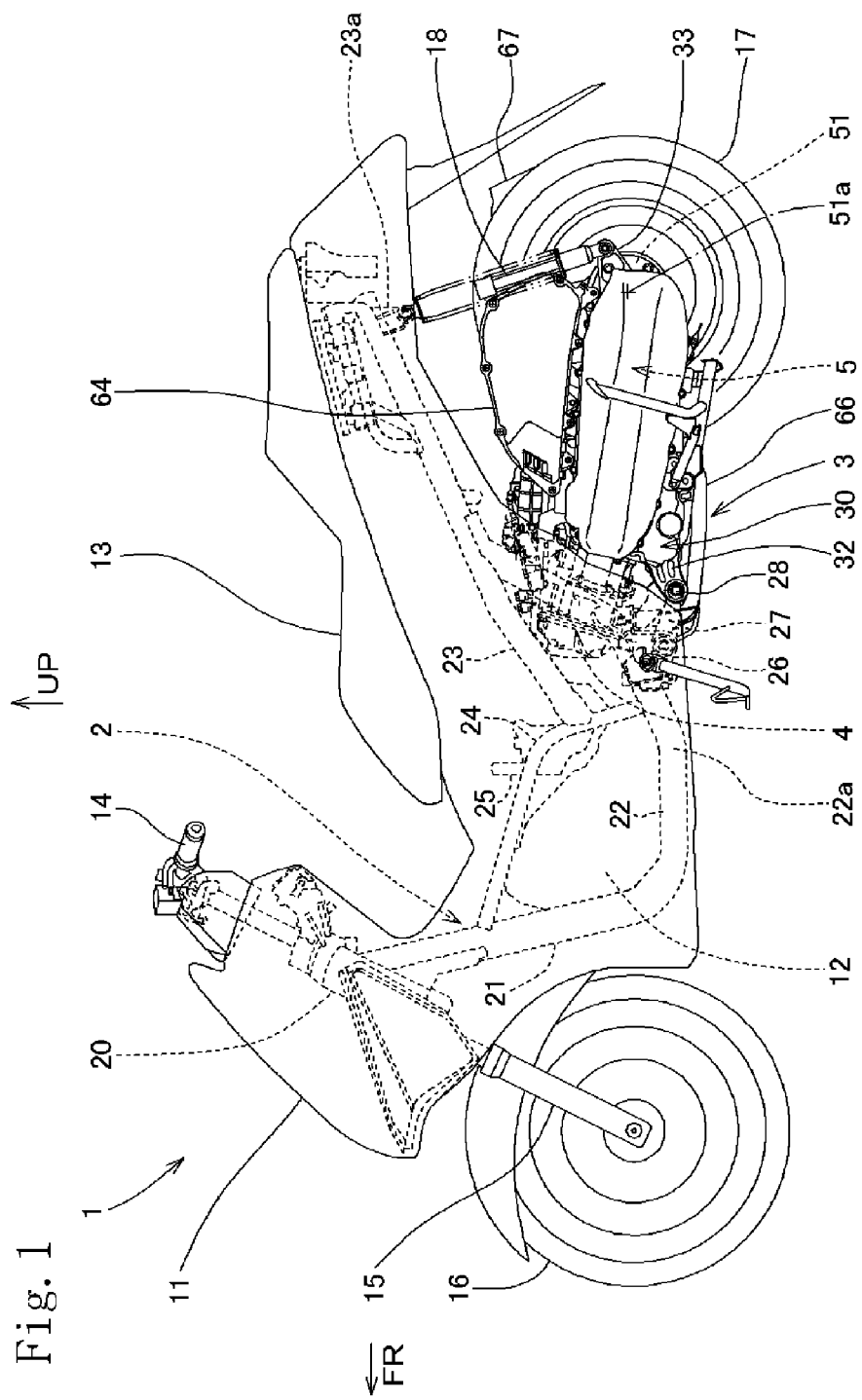
FIG. 1 is left side view of a two-wheel motorcycle having an internal combustion engine mounted thereon, provided with a fixing structure for an exhaust gas sensor of the engine, according to an embodiment of the invention.

A structure for fixing an exhaust gas sensor of an internal combustion engine according to an embodiment of the present invention will be described with reference to the drawings.

In the following description and the claims, "front", "rear", "left", "right", "upper", "lower", etc. are used to mean the directions with respect a vehicle on which is mounted an internal combustion engine provided with the structure for fixing an engine exhaust gas sensor according to the embodiment described. The vehicle, on which the structure for fixing an engine exhaust gas sensor according to the present embodiment is mounted, is a saddle-type vehicle, in particular, a two-wheel motorcycle.

In the drawings, FR shows a front direction of the vehicle, LH a leftward direction of the vehicle, RH a rightward direction of the vehicle, and UP an upward direction of the vehicle.

FIG. 1 shows a left side view of a two-wheel motorcycle 1 in the form of a saddle-type vehicle on which is mounted an internal combustion engine provided with a structure for fixing an exhaust gas sensor of an internal combustion engine according to an embodiment of the present invention. As shown in FIG. 1, the two-wheel motorcycle 1 has a vehicle frame 2 covered with a cover or cowl 11 made of a synthetic resin.

The vehicle frame 2 forming the framework of the vehicle 1 includes a pair of left and right downtubes 21 extending downward from a head pipe 20 in the front part of the vehicle, and a pair of left and right floor pipes 22 connected to the lower ends of the downtubes 21 and extending horizontally rearward. The floor pipes 22 have rearwardly and upwardly extending bent portions 22a, respectively. The rear ends of the sloping portions 22a are joined to left and right main pipes 23, respectively, at intermediate portions of the main pipes.

A pair of left and right center frame members 24 fixedly join the sloping bent portions 22a of the floor pipes 22 and upper portions of the downtubes 21, respectively. The left and right center frame members 24 are mutually joined by a cross frame member 25 shaped to curve upwardly.

The main pipes 23 have their front ends fixedly joined to the center frame members 24, respectively. The main pipes 23 extend rearward and upward and have their rear ends joined to each other.

The left and right floor pipes 22 are joined to each other, to increase rigidity, with a cross pipe 22b (see FIG. 2) in a rear portion of the bent portions 22a.

A fuel tank 12 is mounted in an area surrounded by the downtubes 21, the floor pipes 22 and the center frame members 24, and a driver's seat 13 is mounted on the main pipes 23.

In the front region of the vehicle are provided a steering handle 14 rotatably supported in and above the head pipe 20, and a front fork 15 rotatably supported in and below the head pipe 20. A front wheel 16 is rotatably supported at the lower end of the front fork 15.

Brackets 26 are fixedly provided to protrude downward at the rear of the sloping bent portions 22a of the floor pipes 22, and a power unit 3 is swingably mounted on the brackets 26 through link members 27.

The power unit 3 includes in its front part a single-cylinder, four-stroke, water-cooled SOHC-type internal combustion engine 4. The engine 4 is mounted to take such a forwardly inclined attitude in which the engine has its cylinder axis X (see FIG. 2) so oriented to incline forwardly to such a degree as to take a nearly horizontal attitude. The engine 4 has a crankcase 30, from a lower end of which integrally extends a hanger bracket 32, and the free end of the hanger bracket 32 is pivotally connected to free ends of the link members 27 by means of a pivot shaft 28.

The power unit 3 includes a belt-type continuously variable transmission 5 in the rear of the engine 4, and a reduction gear mechanism 51 is provided at the rear of the continuously variable transmission 5. The reduction gear mechanism 51 has an output shaft which is a rear axle 51a on which a rear wheel 17 is supported.

A bracket 33 protrudes from a rear part of the power unit 3 in the neighborhood of the reduction gear mechanism 51. Another bracket 23a protrudes from rear parts of the main pipes 23. A rear cushion 18 is interposed between the brackets 23a and 33.

Figure 2:
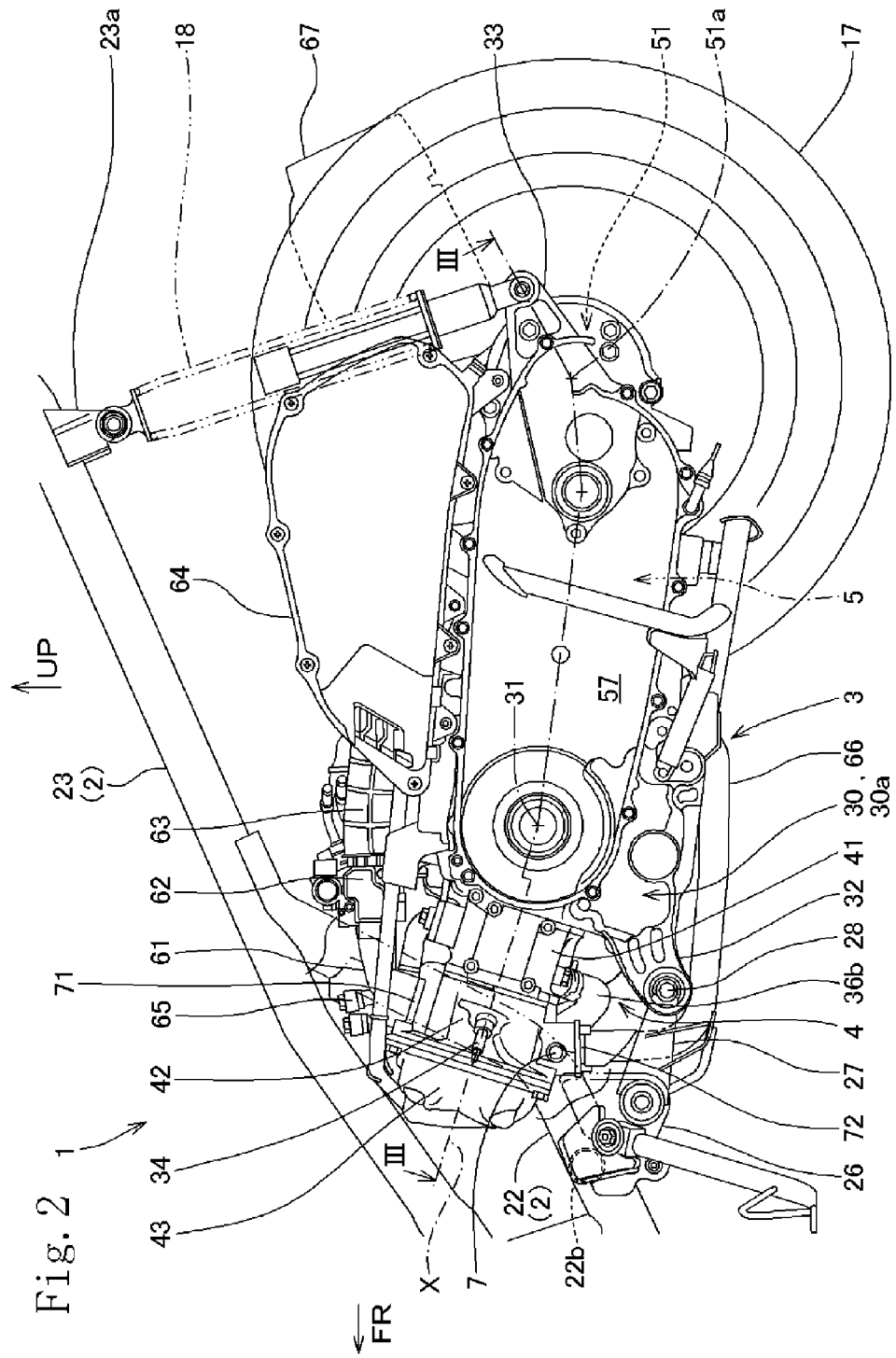
FIG. 2 is a left side view of a power unit of the motorcycle, showing a left crankcase section of a crankcase for encasing a belt-type continuously variable transmission, which is removed in this figure.

Referring to FIG. 2 showing a left side view of the power unit 3, the engine 4 includes a cylinder block 41 fixed to the crankcase 30. A cylinder head 42 and a cylinder head cover 43 are fixedly attached to the crankcase 30 in this order such that the cylinder axis X is oriented to incline forwardly to such a degree as to take a nearly horizontal attitude. An upper portion of the largely inclined cylinder head 42 of the engine 4 at the upper part of the power unit 3 is provided with an opening of an air intake port 71, from which an air intake pipe 61 extends upwardly and rearwardly in curved shape. The intake pipe 61 has therein a throttle body 62 located above the cylinder block 41. An air cleaner 64 is connected to the throttle body 62 via a connection pipe 63 and arranged above the continuously variable transmission 5. An injector 65 for injecting fuel into the intake port 71 is provided in the intake pipe 61.

FIG. 2 shows a left crankcase section 30L (see also FIG. 3) forming the crankcase 30, but the continuously variable transmission 5 accommodated in the crankcase is not shown.

The cylinder head 42 has at a lower part thereof an exhaust port 72 from which an exhaust pipe 66 extends downward and then bent to the right. The exhaust pipe 66 then extends to the rear along the right side of the vehicle and is finally connected to a muffler 67 positioned on the right side of the rear wheel 17.

To the left side of the cylinder head 42 is attached an ignition plug 34, while an exhaust gas sensor 7 is attached to the cylinder head 42 in the neighborhood of the opening of the exhaust port 72. The ignition plug 34 and the exhaust gas sensor 7 are superposed in position with the vehicle frame 2 (floor pipes 22) when seen in side view of the vehicle, whereby the ignition plug 34 and the exhaust gas sensor 7 are covered and protected by the vehicle frame 2.

To the right lower side of the cylinder block 41 is connected a cooling water tube 36b from a water pump 36 (see FIG. 3) mounted on the right side of the cylinder head 42 and the cylinder head cover 43. The cooling water tube 36b is connected to the cylinder block 41 by extending along the right side of the cylinder head 42.

Figure 3:
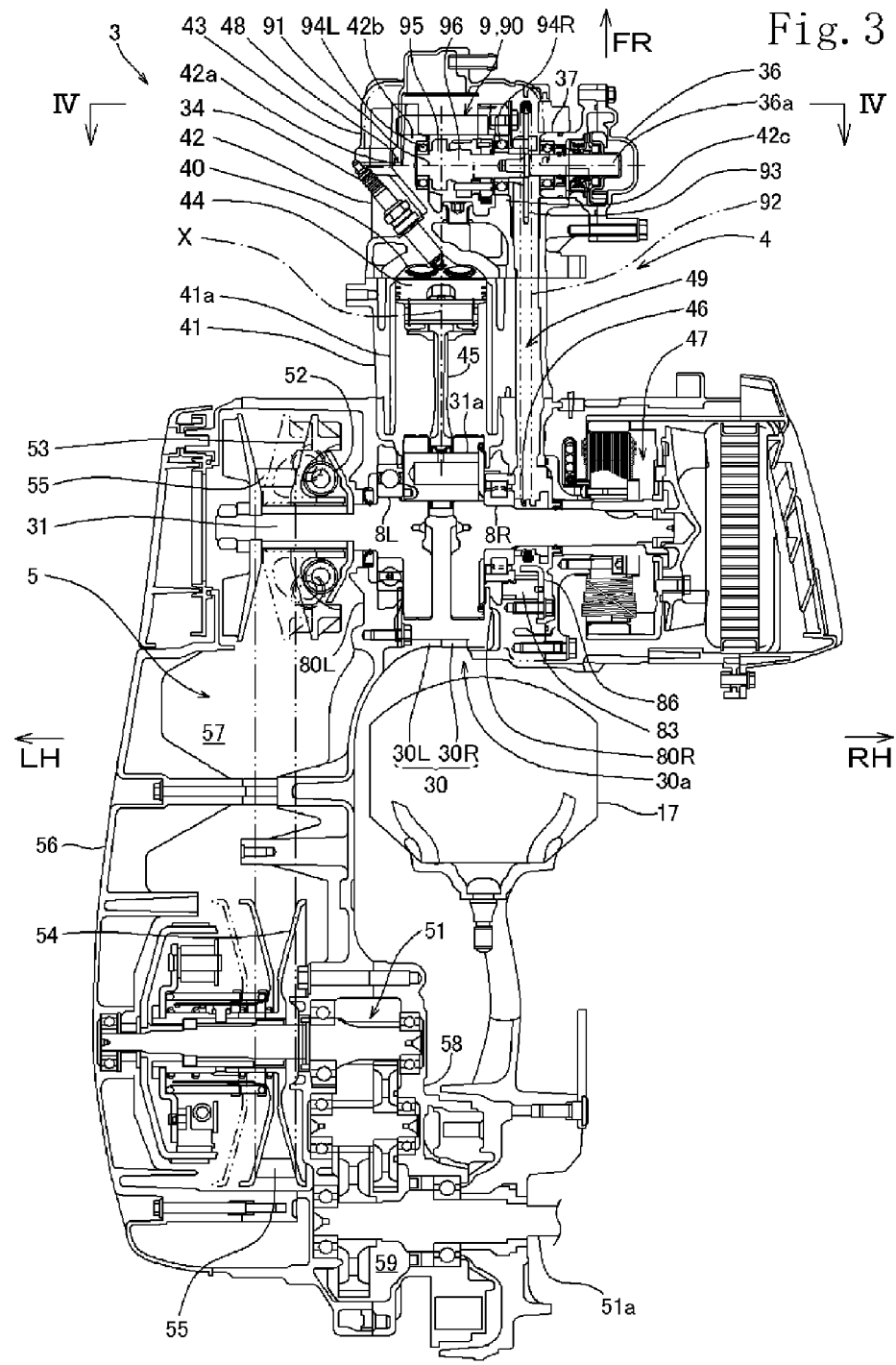
FIG. 3 is a section taken along the line in FIG. 2 and viewed in the direction of the arrows.

FIG. 3 is a section of the power unit 3, taken on the line IV-IV in FIG. 2.

In the engine 4, a piston 44 is slidably received in a cylinder liner 41a of the cylinder block 4, and a connecting rod 45 connects the piston 44 with a crank pin 31a of a crankshaft 31.

Within the cylinder head 42 is formed a combustion chamber 40 facing the top surface of the piston 44.

The crankcase 30 is made up of a left crankcase section 30L and a right crankcase section 30R which are united together. The right crankcase section 30R forms a half member of a crankcase structure 30a, while the left crankcase section 30L forms a half member of the crankcase structure 30a and bulgingly extends rearward to form a transmission case member for encasing the continuously variable transmission 5 which is elongated in the front-to-rear direction of the vehicle.

The left-side surface of the left crankcase section 30L, which is elongated in the front-to-rear direction of the vehicle, is covered by a transmission cover 56 to define a transmission chamber 57 for accommodating the continuously variable transmission 5 therein. The left crankcase section 30L has in its rear region an opening which is covered by a reduction gear cover 58. Inside the reduction gear cover 58 is defined a reduction gear chamber 59 in which a reduction gear mechanism 51 is installed.

As shown in FIG. 3, the crankcase structure 30a is formed by the right crankcase section 30R and a front portion of the left crankcase section 30L. Within the crankcase structure 30a is placed the crankshaft 31, which is rotatably supported by a left main bearing in the left crankcase section 30L and a right main bearing in the right crankcase section 30R. The left main bearing is a ball bearing 8L, and the right main bearing is a roller bearing 8R which is smaller in diameter but greater in rated load than the ball bearing 8L.

The crankshaft 31 has horizontally extending left and right extensions. The right crankshaft extension has thereon a sprocket 46 for driving a cam chain 92 and is connected to an AC generator 47, while the left crankshaft extension has thereon a driving pulley 53 and a centrifugal weight 52 which are parts of the belt-type continuously variable transmission 5.

The engine 4 adopts a SOHC-type four-valve system and has a valve-moving mechanism 9 including a cam shaft 91 and so on within the cylinder head 42.

The valve-moving mechanism 9 is installed in a valve-moving mechanism chamber 90 defined by the cylinder head 42 and the cylinder head cover 43 and on a front part of the cylinder head 42. The cam shaft 91 has thereon an intake cam 95 and an exhaust cam 96. The cam shaft 91 is rotatably supported by a left side wall 42b of the cylinder head 42 and an inner wall 42c defining a cam chain chamber 49 via a left bearing 94L and a right bearing 94R, respectively. Rotation of the cam shaft 91 causes the intake cam 95 and the exhaust cam 96 to rotate, whereby an intake valve 73 and an exhaust valve 74 (see FIG. 4) are opened and closed.

A cylinder head cover 43 is applied to an abutting surface 42a of the cylinder head 42 via a gasket 48 as an elastic seal member, so that the valve-moving mechanism 9 is covered by the cylinder head cover 43.

The cam chain 92 extends between the crankshaft 31 and the cam shaft 91 to transmit motive power from the crankshaft 31 to the valve-moving mechanism 9. A cam chain chamber 49 is provided for the cam chain 92 so as to communicate with the interior spaces of the right crankcase section 30R, the cylinder block 41 and the cylinder head 42.

The cam shaft 91, which is directed to left-right horizontal direction, has on its right end a driven cam chain sprocket 93, and the crankshaft 31 has a driving cam chain sprocket 46. The cam chain 92 extends in the cam chain chamber 49 between the driving cam chain sprocket 46 and the driven cam chain sprocket 93. The cam shaft 91 is rotated in synchronism with the crankshaft 31 at half a rotational speed of the crankshaft 31.

In the cylinder head 42, an ignition plug 34 is fitted toward the combustion chamber 40 on the left side of the cylinder head 42, opposite to the cam chain chamber 49 (see FIG. 2).

A circular opening is formed between the abutting surfaces of the cylinder head 42 and the cylinder head cover 43 and at their right side, and a cylindrical water pump body 37 of a water pump 36 is fitted and fixed water-tightly.

The water pump 36 has a pump drive shaft 36a which is connected coaxially to the right end of the cam shaft 91.

The continuously variable transmission 5 positioned on the left side of the power unit 3 has a drive pulley 53, a driven pulley 54 and a V-belt 55 passed around the pulleys, and motive power is transmitted thereto from the crankshaft 31. In accordance with the rotational speed of the engine, the centrifugal weight 52 is moved radially so that the radius of the drive pulley 53 is changed to vary the radius of the V-belt 55 passed around the drive pulley 53. This causes variation of the V-belt 55 passed around the driven pulley 54, whereby continuous variation of the transmission ratio is made automatically. The motive power thus transmitted to the driven pulley 54 is subjected to speed reduction by means of the reduction gear mechanism 51 and transmitted to the rear axle 51a so that the rear wheel 17 is driven in rotation.

Variable transmission mechanism comprising the continuously variable transmission 5 and the reduction gear mechanism 51 is well known in the art and will not be described in further details.

Figure 4:
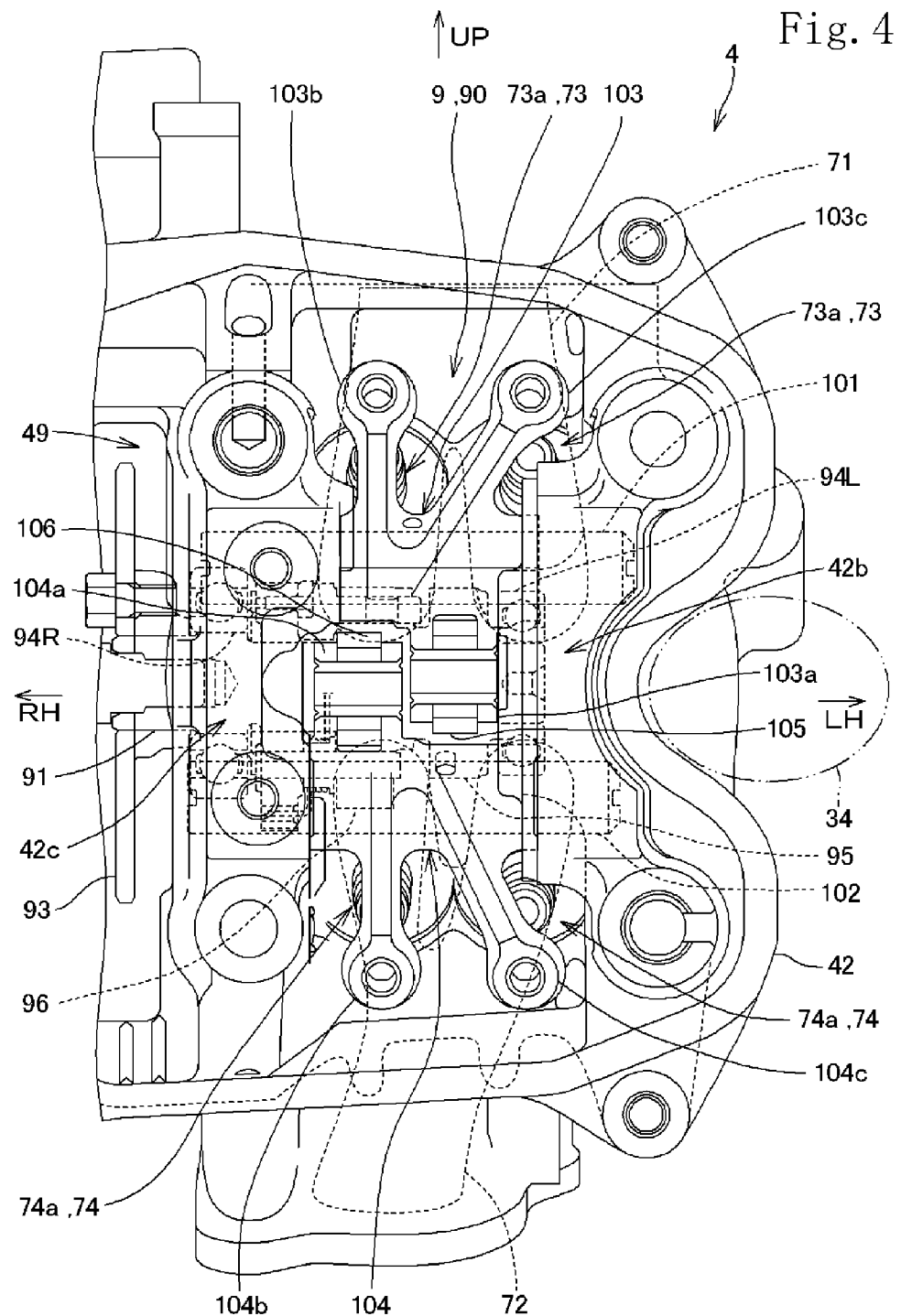
FIG. 4 is a front view of a cylinder head, with a cylinder head cover removed, as viewed in the direction of the arrows IV-IV in FIG. 3.

FIG. 4 shows a view taken along the line IV-IV in FIG. 3, of a principal part of the cylinder head 42 with the cylinder head cover 43 removed. FIG. 4 is a view seen from the front side. Therefore, the left side in the figure is the right side of the cylinder head 42 and the right side is the left side of the cylinder head 42.

As shown in FIG. 4, a pair of an intake-side rocker lever shaft 101 and an exhaust-side rocker lever shaft 102 are provided in parallel at positions shifted to the front of the cam shaft 91 (see FIG. 3). These rocker lever shafts 101 and 102 are supported at their two ends by the left side wall 42b and the inner wall 42c on the cylinder head 42. The intake-side rocker lever shaft 101 and the exhaust-side rocker lever shaft 102 swingably support thereon an intake-side rocker lever 103 and an exhaust-side rocker lever 104, respectively, which levers are disposed in adjoining disposition.

The engine 4 on the motorcycle 1 in which the embodiment of the invention is employed has a single cylinder and is of the SOHC-type with the four-valve system. Therefore, the cylinder head 42 has two intake valves 73 and two exhaust valves 74. The intake-side rocker lever 103 has an inwardly extending roller support arm 103a in bifurcated shape on which a roller 105 as a cam follower contacting the intake cam 95 is rotatably supported. The intake-side rocker lever 103 also has two outwardly extending arms with distal ends 103b and 103c which are in contact with tip ends of stems 73a of the two intake valves 73, respectively.

The exhaust-side rocker lever 104 has an inwardly extending roller support arm 104a in bifurcated shape on which a roller 106, as a cam follower contacting the exhaust cam 96, is rotatably supported. The exhaust-side rocker lever 104 also has two outwardly extending arms with distal ends 104b and 104c which are in contact with tip ends of stems 74a of the two exhaust valves 74, respectively.

The intake valves 73 and the exhaust valves 74 are constantly urged to close by valve springs. Therefore, the rollers 105 and 106 of the intake-side and exhaust-side rocker levers 103 and 104 are constantly urged to contact the intake and exhaust cams 95 and 96, respectively. Consequently, as the intake and exhaust cams 95 and 96 on the cam shaft 91 are rotated, the intake-side and exhaust-side rocker levers 103 and 104 are caused to swing in accordance with the peripheral configurations of the intake and exhaust cams 95 and 96, whereby the intake valves 73 and the exhaust valves 74 are caused to be opened and closed at predetermined opening and closing timings and with predetermined amounts of lift.

Referring to FIGS. 2 and 3, intake gas sucked through the intake port 71 is mixed with fuel injected from the injector 65 to produce a gas-fuel mixture and sucked into the combustion chamber 40 through the intake valves 73 opened in the intake stroke. The thus sucked gas-fuel mixture is compressed in the compression stroke in which the piston 44 approaches the cylinder head 42.

The gas-fuel mixture is burnt as a result of ignition by the ignition plug 34 at a terminal period of the compression stroke. The piston 44 is forced to move away from the cylinder head 42 by combustion gas pressure in the expansion stroke and drives the crankshaft 31 in rotation.

Combustion gas is discharged from the combustion chamber 40 through the opened exhaust valves 74 and the exhaust port 72 and then through the exhaust pipe 66 to the outside of the engine 4, in the exhaust stroke in which the piston 44 approaches the cylinder head 42.

Figure 5:
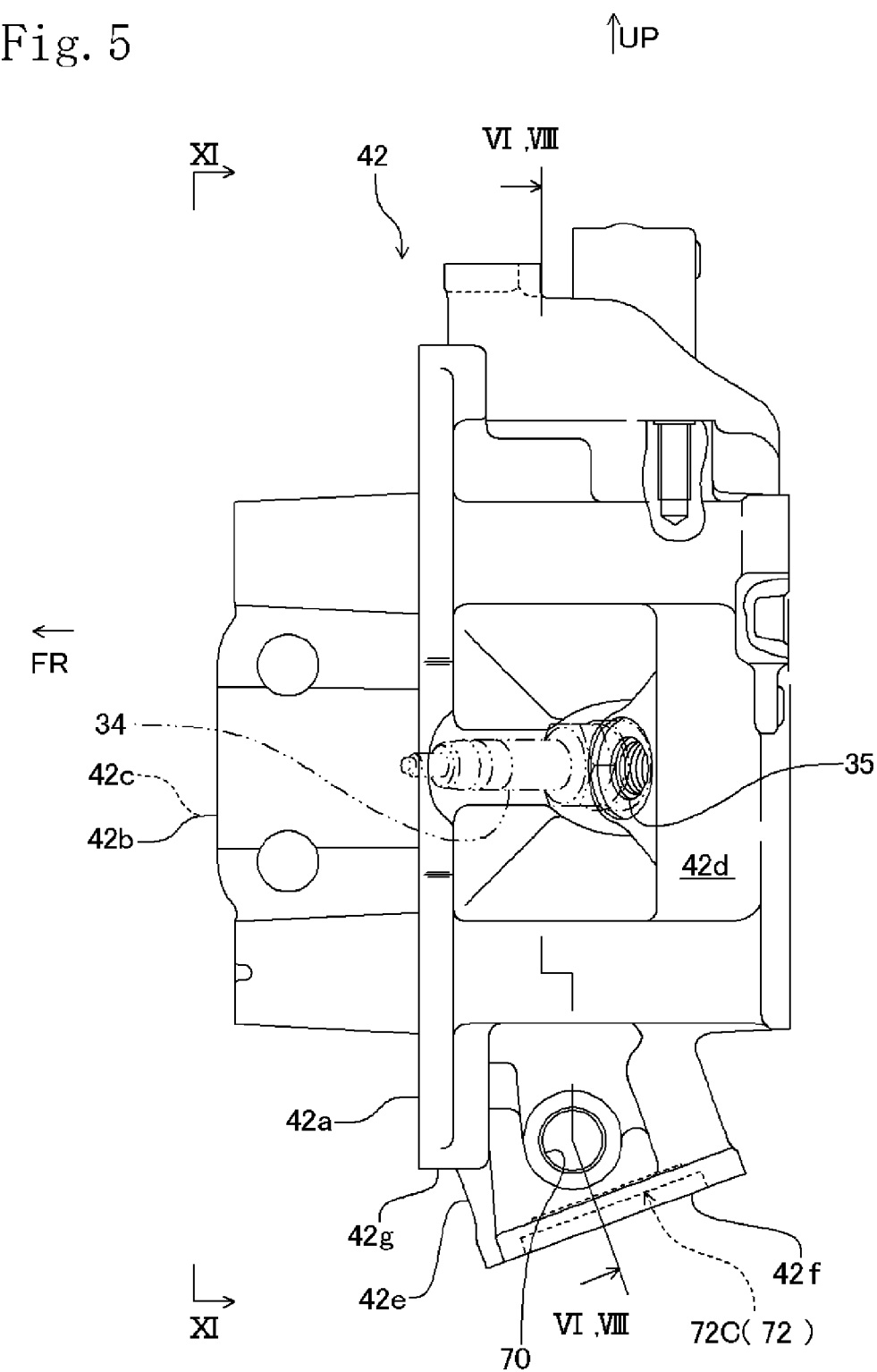
FIG. 5 is a left-side view of the cylinder head of the engine shown in FIG. 2.

FIG. 5 is a left side view showing the cylinder head 42 of the engine 4 shown in FIG. 2.

In FIG. 5, the left side wall 42b (also see FIG. 3) of the cylinder head is shown as protruding to the front beyond the abutting surface 42a of the cylinder head 42, to which the cylinder head cover 43 is attached. The inner wall 42c is located behind the left side wall 42b in FIG. 5.

The cylinder head 42 has a left side surface 42d in which an ignition pug hole 35 is formed. The ignition plug 34 is fitted in the ignition pug hole 35. The ignition plug 34 has a tip end, which is, as indicated in FIG. 3, positioned at approximately a center region in the combustion chamber 40 between the two intake valves and the two exhaust valves.

From the cylinder head 42, an exhaust gas guide pipe-wall 42e defining the exhaust port 72 extends downward. At the lowermost part of the exhaust gas guide pipe-wall 42e is formed an exhaust pipe connecting portion 42f as outlet of the exhaust port 72.

In the left side wall of the exhaust gas guide wall 42e is formed an exhaust gas sensor fitting hole 70 in which an exhaust gas sensor 7 is fitted. The exhaust gas sensor fitting hole 70 is in communication with the exhaust port 72.

The exhaust gas sensor 7 is a heater-less oxygen sensor and the like for judging or discriminating a lean region (air surplus region) and a rich region (fuel surplus region). These regions are discriminated by a theoretical air-fuel ratio in between. Results of detection by the exhaust gas sensor are sent to an ECU (engine control unit) and used to control the combustion in the engine 4.

The motorcycle 1, in which the embodiment of the invention is incorporated, has the transversely extending cross pipe 22b shown in FIG. 2 in front of the cylinder head 42 mounted thereon. This cross pipe 22b is an obstacle for securing an ample space in front of the cylinder head. This is especially true when it is considered that the engine 4 makes swinging motion. For this reason, it is difficult to install the exhaust gas sensor 7 in front of the exhaust gas guide wall 42e of the cylinder head 42. Furthermore, since the cooling water tube 36b from the water pump 36 is arranged on the right side of the cylinder head 42 as shown in FIG. 2, it is also difficult to install the exhaust gas sensor 7 on the right side of the exhaust gas guide wall 42e.

The exhaust gas guide wall 42e in the embodiment of the invention is located at a position offset to the right side of the vehicle relative to the cylinder axis X, as will be described later in more details. Consequently, it is easy to obtain a space on the left side of the cylinder head 42. Furthermore, there are no parts or members causing interference on the left side. For these reasons, the exhaust gas sensor 7 is installed on the left side of the exhaust gas guide wall 42e of the cylinder head 42.

Figure 6:
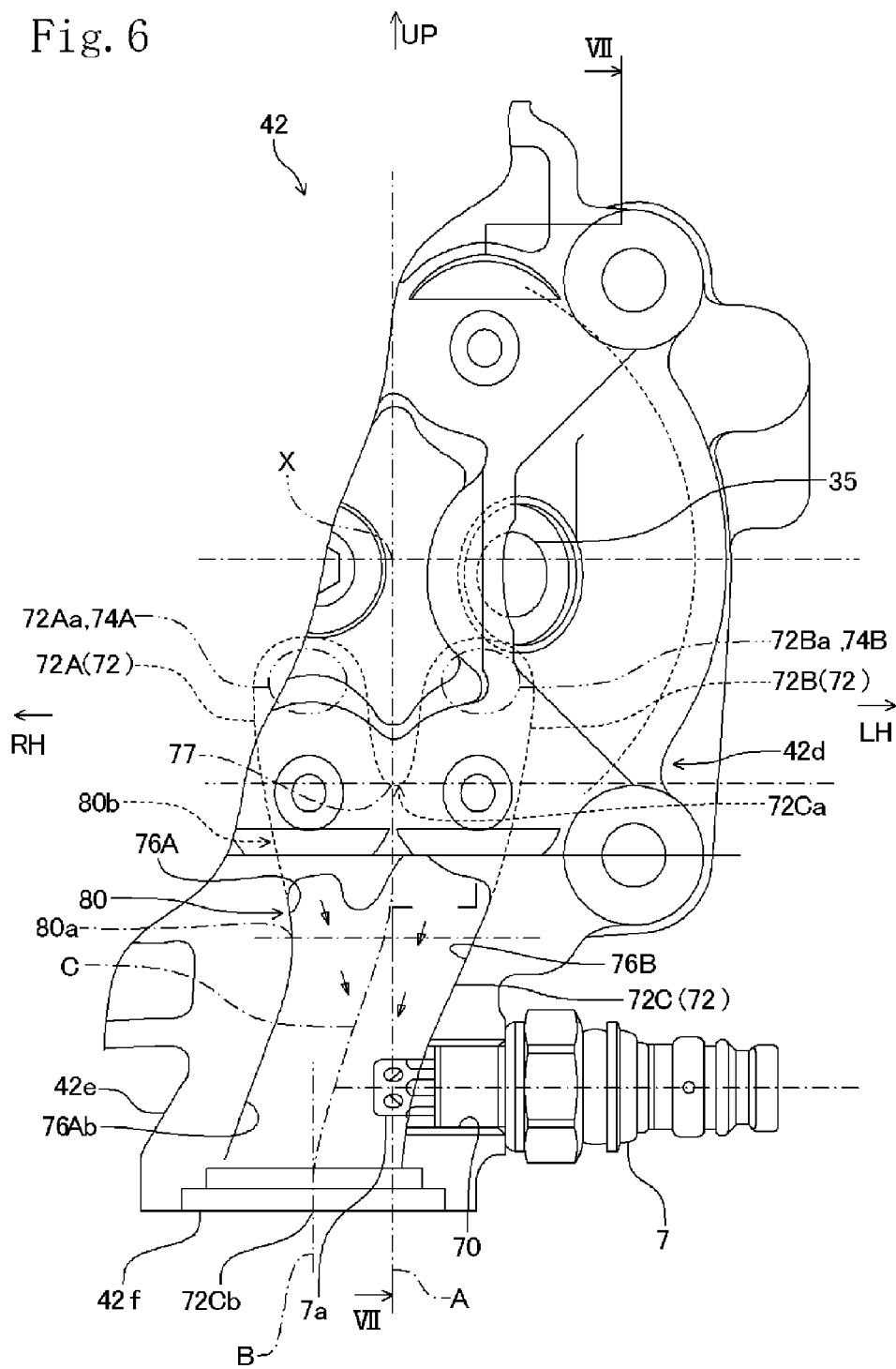
FIG. 6 is a front sectional view of the cylinder head, taken on the line VI-VI in FIG. 5, the exhaust gas sensor being shown fixed to the cylinder head.

FIG. 6 is a front sectional view of the cylinder head 42 as seen in the direction of VI-VI in FIG. 5, the cylinder head being oriented substantially horizontally. The left side in FIG. 6 is the right side of the cylinder head 42, and the right side in FIG. 6 is the left side of the cylinder head 42. The exhaust gas sensor 7 is seen as attached to the cylinder head 42.

Since the engine 4, in which the embodiment of the invention is employed, adopts the SOHC-type, four-valve system, the exhaust port 72 formed in the cylinder head 42 is, as shown in FIG. 6, made up of a right exhaust port section 72A, as a first exhaust port section, having an upstream inlet 72Aa which is opened and closed by a right exhaust valve 74A, as a first exhaust valve, a left exhaust port section 72B, as a second exhaust port section, having an upstream inlet 72Ba which is opened and closed by a left exhaust valve, as a first exhaust valve, and a collective exhaust port section 72C into which downstream portions of the right and left exhaust port sections 72A and 72B in parallel arrangement merge.

At the most downstream portion of the collective exhaust port section 72C is formed the above-mentioned exhaust pipe connecting portion 42f.

The collective exhaust port section 72C has an inner wall 76B in an area adjacent to the left exhaust port section 72B, and the exhaust gas sensor fitting hole 70 is formed in the inner wall 76B. The exhaust gas sensor 7 is screw-fitted in the exhaust gas sensor fitting hole 70 with a sensing tip 7a thereof positioned within the collective exhaust port section 72C.

On the other hand, the collective exhaust port section 72C has an inner wall 76A in an area adjacent to the right exhaust port section 72A and opposite to the exhaust gas sensor fitting hole 70. An arcuate bulged guide part 80 is formed on the inner wall 76A in an area upstream of the exhaust gas sensor 7, to guide exhaust gas toward the exhaust gas sensor 7.

Thus, although the right exhaust port section 72A is positioned more remote from the exhaust gas sensor 7 than the left exhaust port section 72B, exhaust gas flowing in the right exhaust port section 72A remote from the exhaust gas sensor 7 is guided by the guide part 80 toward the exhaust gas sensor 7. For this reason, exhaust gas currents passing in the right exhaust port section 72A and the left exhaust port section 72B are guided and intermixed with each other at the position of the exhaust gas sensor 7 or at a position upstream of the position of the exhaust gas sensor 7. As a result, sensing accuracy of the exhaust gas sensor 7 is improved.

More specifically, the mounting position of the exhaust gas sensor 7 is determined to be offset toward one of the exhaust port sections, i.e. toward the left exhaust port section 72B with respect to a passage centerline C, shown in FIG. 6, of the collective exhaust port section 72C, while the guide part 80 is formed to be offset toward the other exhaust port section, i.e. toward the right exhaust port section 72A with respect to the passage centerline C.

For that reason, even though the mounting position of the exhaust gas sensor 7 is offset on one side of the passage centerline C of the collective exhaust port section 72C, the guide part 80 operates effectively to urge exhaust gas current from the right exhaust port section 72A positioned on the remote side of the exhaust gas sensor 7, toward the exhaust gas sensor 7, whereby sensing accuracy of the exhaust gas sensor 7 is improved.

Additionally, the exhaust gas sensor 7 can be activated at early time in the case the sensor 7 is a heater-less oxygen sensor.

The guide part 80 is formed on the inner wall 76A of the collective exhaust port section 72C adjacent to the right exhaust port section 72A, to have a bulging slope 80b with such a bulging amount as to increase in a direction from the upstream side to the downstream side toward the exhaust gas sensor 7. The guide part 80 has a portion 80a of a maximum amount of bulging toward the exhaust gas sensor 7.

The collective exhaust port section 72C has an upstream end 72Ca which is located upstream of the portion 80a of a maximum bulging amount.

Consequently, it is easy to secure an ample cross-sectional passage area in the region of the maximum bulging amount portion 80a of the guide part 80, thereby maintaining reduced resistance to the current of the exhaust gas.

The exhaust gas sensor 7 is attached to the exhaust gas sensor fitting hole 70 in the exhaust gas guide pipe-wall 42e of the cylinder head 42, by screw-fitting from the left side. The sensing tip 7a of the sensor 7 is located in the collective exhaust port section 72C, at a position on a first imaginary line A which passes through both the cylinder axis X and a passage center 77 corresponding to the upstream end 72Ca of the collective exhaust port section 72C, as seen in the front view.

For this reason, exhaust gas currents passing through both the right and left exhaust port sections 72A and 72B are caused to be effectively directed against the exhaust gas sensor 7.

The axis of the exhaust gas sensor 7 is perpendicular to the first imaginary line A.

The inner wall 76B of the collective exhaust port section 72C, on the side of the exhaust gas sensor 7, is shaped to approach the first imaginary line A toward the right, as the inner wall 76B extends from the upstream side to the downstream side. Therefore, even though the exhaust gas sensor 7 is attached on the side of one of the exhaust port sections 72A and 72B, i.e. the left exhaust port section 72B, the sensing tip 7a of the sensor 7 is shifted toward the side of the other exhaust port section, i.e. the right exhaust port section 72A.

The inner wall 76A of the collective exhaust port section 72C, which is opposite to the exhaust gas sensor 7 and adjacent to the right exhaust port section 72A, has a portion 76Ab downstream of the maximum bulging portion 80a of the guide part 80. This portion 76Ab of the inner wall 76A is shaped to slope away from the first imaginary line A to the right.

In addition to the sloping configuration to the right, of the inner wall 76B on the side of the exhaust gas sensor 7, the portion 76Ab of the inner wall 76A, downstream of the maximum bulging portion 80a of the guide part 80, is configured to slope to the right away from the first imaginary line A, i.e. from the exhaust gas sensor 7, in conformity with or in parallel with the slope of the inner wall 76B on the side of the exhaust gas sensor 7. This ensures unchanged current passage area throughout the exhaust port.

The internal combustion engine 4 employing the embodiment of the invention is mounted on the motorcycle 1 in the form of a saddle-type vehicle (see FIG. 1). As shown in FIG. 6, the right and left exhaust port sections 72A and 72B are arranged in side-by-side disposition in the transverse direction of the vehicle. Due to the rightward sloping configuration of the inner wall 76B, on the side of the exhaust gas sensor 7, of the collective exhaust port section 72C, an axis B of the exhaust pipe connecting portion 42f is also gradually shifted to the right in the vehicle transverse direction relative to the first imaginary line A. As a result, the exhaust gas guide pipe-wall 42e of the cylinder head 42, in which the collective exhaust port section 72C is formed with the exhaust gas sensor 7, is also gradually shifted to the right in the vehicle transverse direction.

Consequently, the exhaust gas sensor 7, on the first imaginary line A, fixed to the exhaust gas guide wall 42e is also shifted relative to the cylinder axis to the same rightward direction, together with the rightward gradual shift of the axis B of the exhaust pipe connecting portion 42f, so that the exhaust gas sensor 7 is prevented from protruding to the left in the vehicle transverse direction and the fixing structure of the exhaust gas sensor is well adapted for use in motorcycles.

Figure 7:
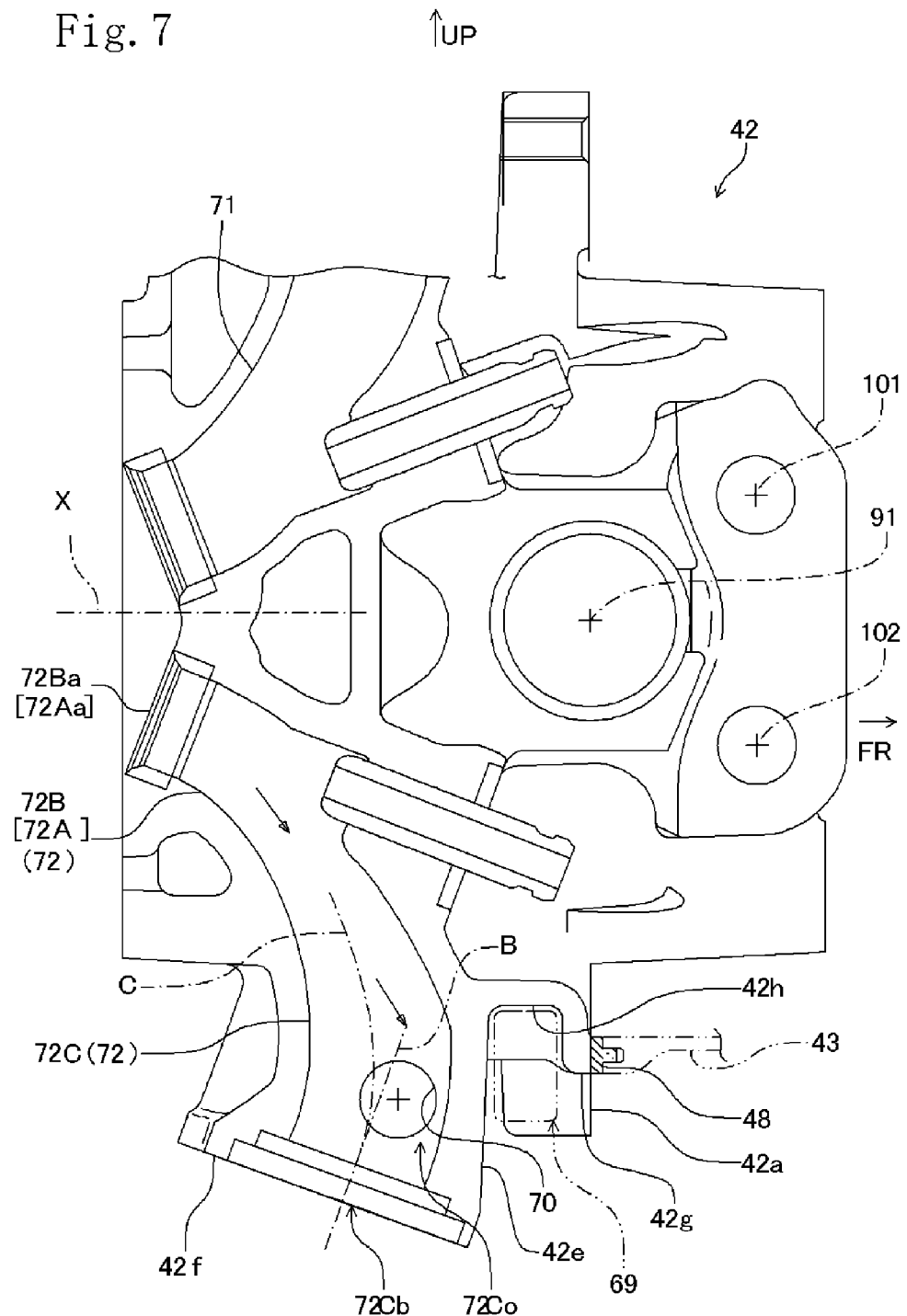
FIG. 7 is a right-side sectional view of the cylinder head, taken on the line VII-VII in FIG. 6.

FIG. 7 shows a right side sectional view of the cylinder head 42, taken on the line VII-VII in FIG. 6.

As shown in FIG. 7, the right exhaust port section 72A (not shown in FIG. 7), the left exhaust port section 72B and the collective exhaust port section 72C are shaped to extend in arcuate configuration, as viewed in the vehicle transverse direction, from upstream inlets 72Aa and 72Ba facing toward the front of the engine 4 (cylinder head 42) to a lower downstream end 72Cb of the collective exhaust port section 72C. The exhaust gas sensor fitting hole 70 is arranged at a position in front of the passage centerline C of the collective exhaust port section 72C.

The exhaust gas sensor fitting hole 70 is thus positioned in the arcuate collective exhaust port section 72C at a position forwardly shifted to the front relative to the passage centerline C of the collective exhaust port section 72C, in other words, in a radially outer region 72Co of the arcuate exhaust passage. This is a region in which exhaust gas flows fast and does not stagnate. Therefore, the exhaust gas sensor 7 can operate effectively with improved detection accuracy.

A modified embodiment of the invention will be described with reference to FIGS. 8 and 9.

Figure 8:
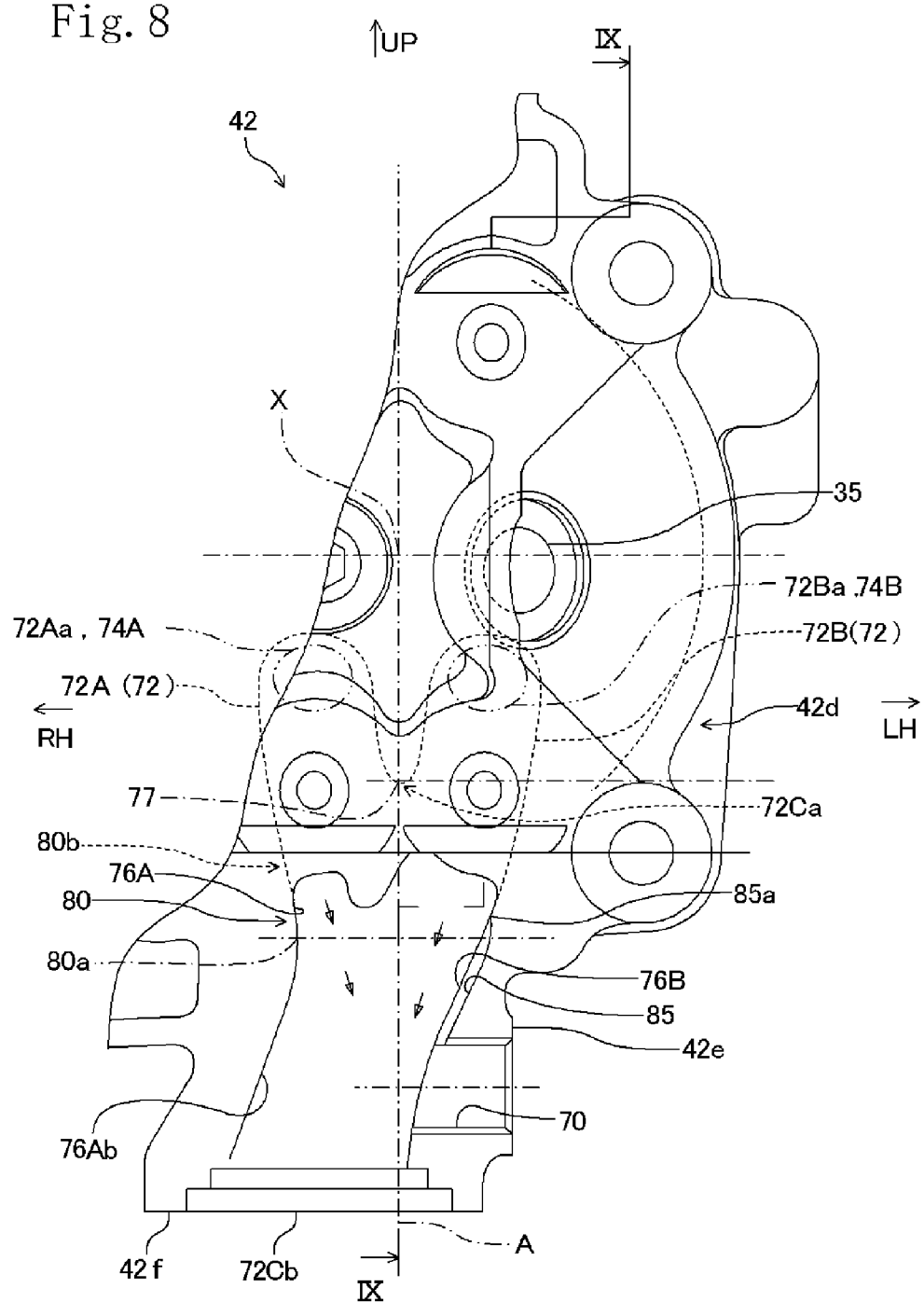
FIG. 8 is a front sectional view, similar to FIG. 6, of the cylinder head according to a modification of the invention, taken on the line VIII-VIII in FIG. 5, the exhaust gas sensor being not shown.

FIG. 8 is a front sectional view similar to FIG. 6 of the cylinder head 42, taken on the line VIII-VIII in FIG. 5. The exhaust gas sensor 7 is removed in the figure.

Figure 9:
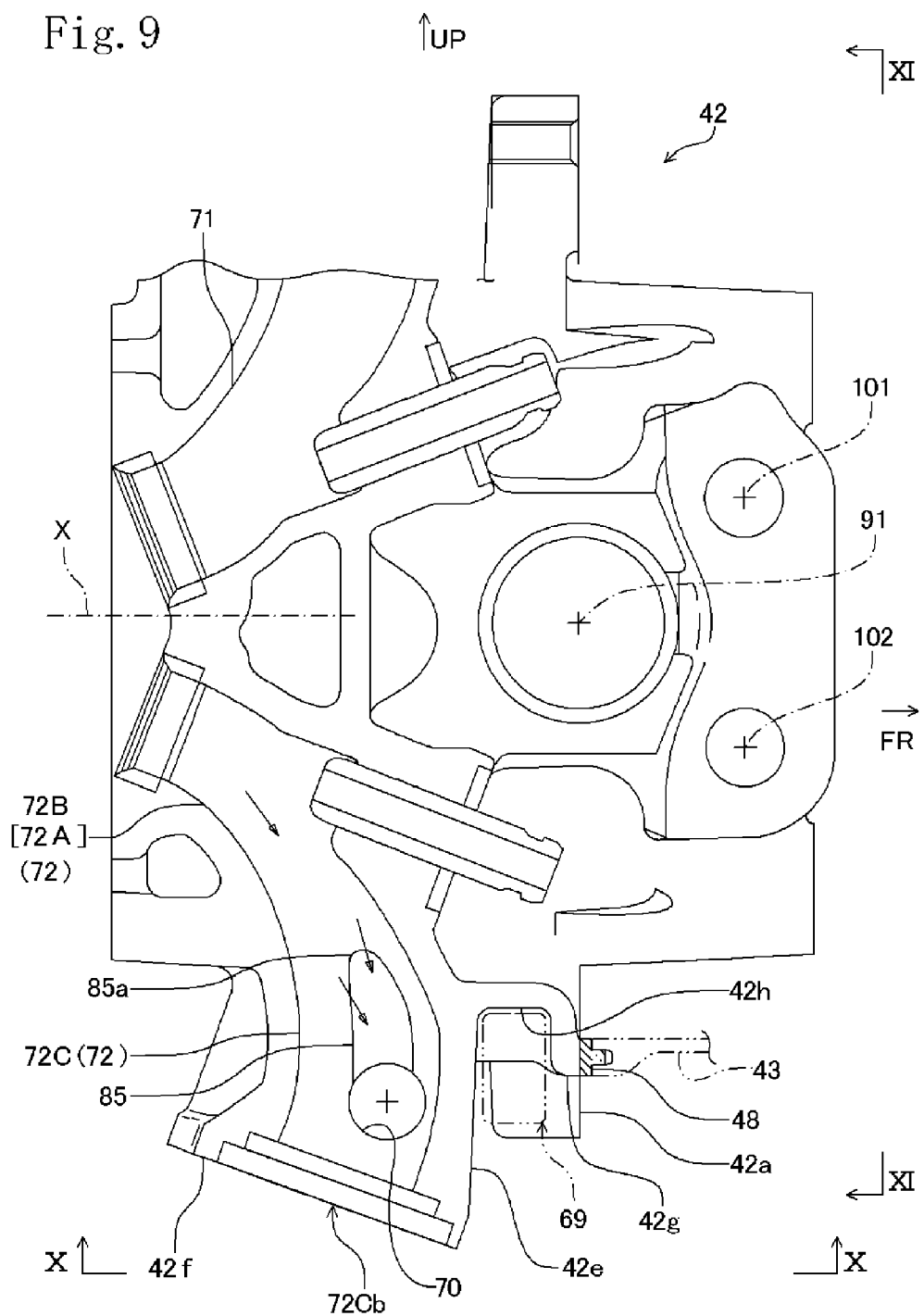
FIG. 9 is a right-side sectional view, similar to FIG. 7, of the cylinder head according to the modification of the invention, taken on the line IX-IX in FIG. 8.

FIG. 9 is a right side sectional view similar to FIG. 7 of the cylinder head 42, taken on the line IX-IX in FIG. 8.

As shown in FIGS. 8 and 9, the modified embodiment is provided with an exhaust gas arresting groove 85, which is formed in the inner wall 76B, on the side of the exhaust gas sensor 7, of the collective exhaust port section 72C and which extends along the passage centerline C of the collective exhaust port section 72C. The exhaust gas arresting groove 85 is located in an area opposing the maximum bulging amount portion 80a of the guide part 80, bulging toward the exhaust gas sensor 7.

The exhaust gas sensor fitting hole 70 for the exhaust gas sensor 7 is positioned at the downstream end of the exhaust gas arresting groove 85.

Exhaust gas flowing along the guide part 80 is thus guided thereby to be directed into the exhaust gas arresting groove 85. Therefore, exhaust gas currents that have passed through the right and left exhaust port sections 72A and 72B are arrested or collected so that the exhaust gas currents can be intermixed with improved effectiveness so as to be directed to the exhaust gas sensor 7. This means that the exhaust gas sensor 7 can be warmed with improved effectiveness and with resultant improved sensing accuracy. In case the exhaust gas sensor 7 is a heater-less oxygen sensor, it can be activated in a shortened time.

It is preferred that the upstream end 85a of the exhaust gas arresting groove 85 be arranged at an upstream position relative to the maximum bulging amount portion 80a of the guide part 80. Such arrangement makes it possible to secure a sufficient amount of cross-sectional area of the collective exhaust port section 72C at the position of the maximum bulging amount portion 80a.

The upstream end 85a should preferably be located in an area downstream of the upstream end 72Ca of the collective exhaust port section 72C, to prevent the exhaust gas arresting groove 85 from arresting too much amount of exhaust gas.

In the first embodiment and the modified embodiment, as shown in FIG. 7 and FIG. 9, a plurality of recesses 42h are provided between a rear surface of a flange 42g forming the abutting surface 42a, with the cylinder head cover 43, of the cylinder head 42 and the exhaust gas guide pipe-wall 42e. The recesses 42h function as heat insulation spaces 69.

Figure 10:
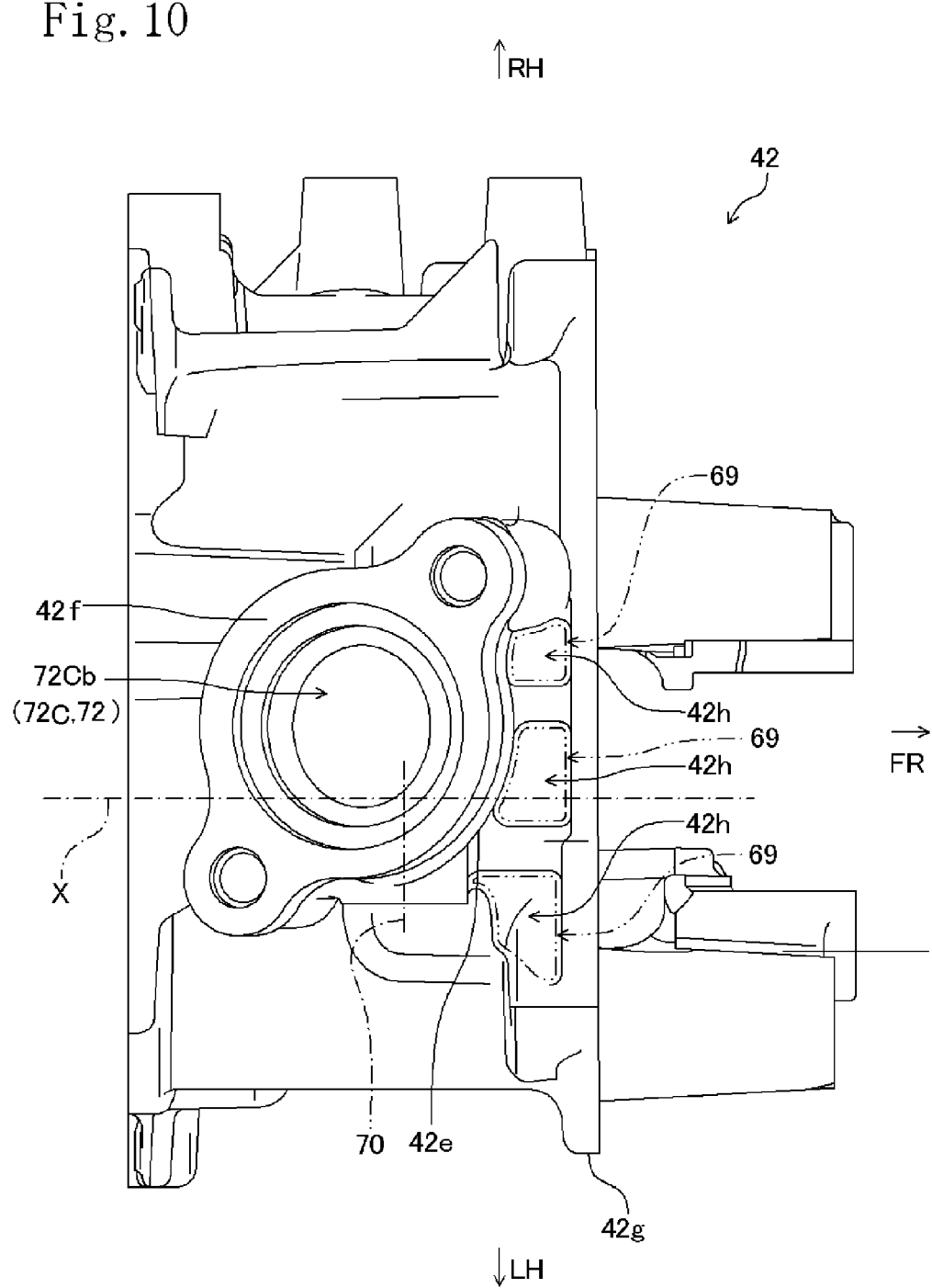
FIG. 10 is a bottom view of the cylinder head as viewed in the direction of the arrows X in FIG. 9.

As indicated in FIG. 10, which is a bottom view of the cylinder head 42 as viewed in the direction of X-X in FIG. 9, the recesses 42h are arranged along the full breadth of the exhaust gas guide pipe-wall 42e defining the collective exhaust port section 72C, so that the heat insulation spaces 69 are also arranged along the full breadth of the exhaust gas guide pipe-wall 42e.

For that reason, conduction of heat in the collective exhaust port section 72C from the surface of the exhaust gas guide pipe-wall 42e directly to the rear surface of the flange 42g is suppressed, so that, as will be understood from FIG. 7, adverse influence is prevented on the elastic gasket 48 (see also FIG. 3) on the abutting surface 42a of the flange 42g, on the side of the cylinder head cover 43.

Figure 11:
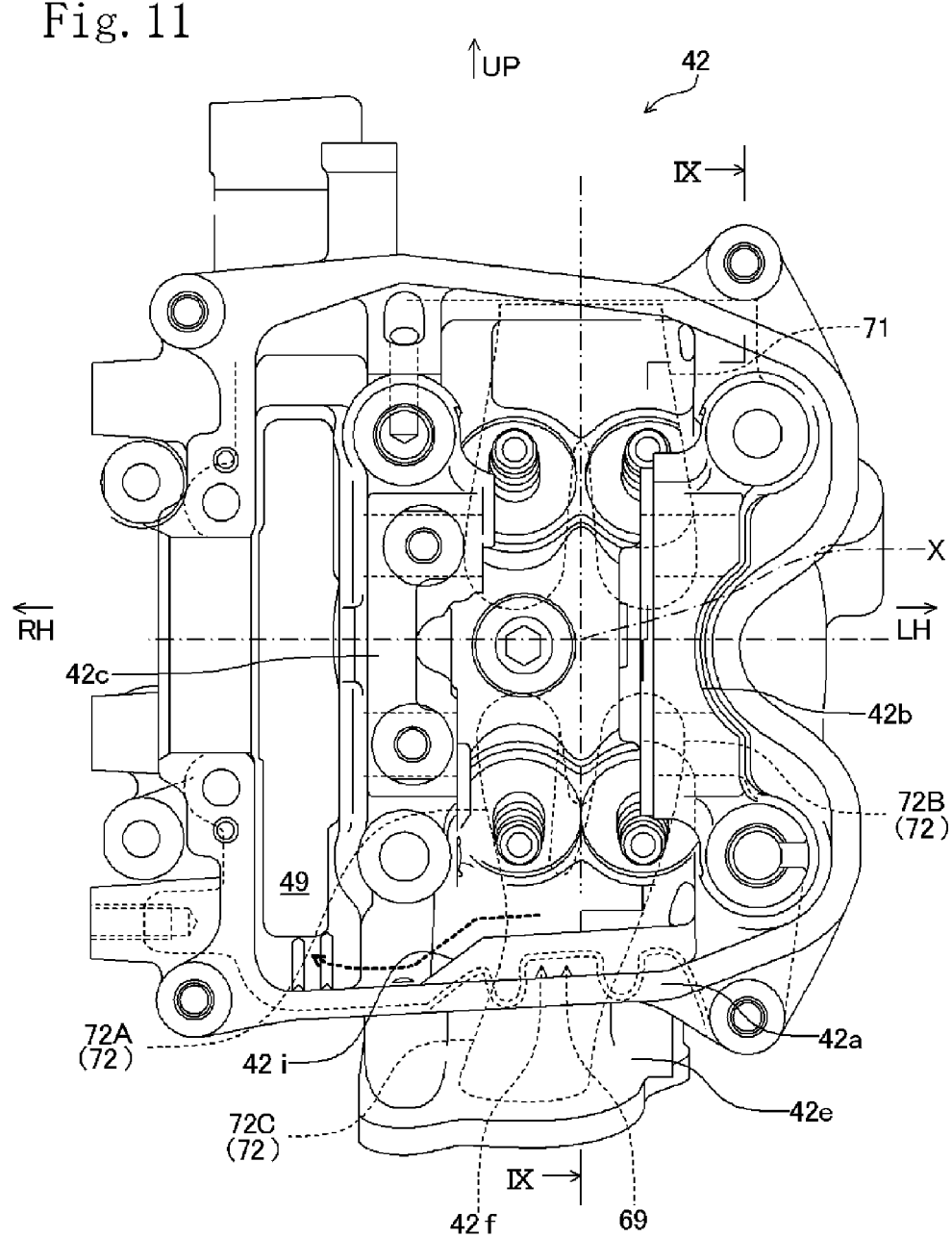
FIG. 11 is a front view of the cylinder head as viewed in the direction of the arrows XI in FIG. 9 (or FIG. 5).

FIG. 11, a front view of the cylinder head 42 as viewed in the direction of XI-XI in FIG. 9 (or FIG. 5), shows that the heat insulation spaces 69 are arranged along the full breadth of the exhaust gas guide pipe-wall 42e defining the collective exhaust port section 72C.

The recesses 42 formed in the cylinder head 42 to define the heat insulation spaces 69 provide a sloping bottom wall 42i in the lower portion of the cylinder head 42, so as to decline toward the cam chain chamber 49. This sloping bottom wall 42i makes it easy to conduct dripping lubricating oil in the cylinder head 42 into the cam chain chamber 49 functioning as an oil return passage (see the thick arrow line in the figure).

Structures for fixing an engine exhaust gas sensor according to an embodiment of the invention and a modification thereof have been described above. The present invention is not limited to these embodiment and modification and can be practiced in wide variety within the scope of the invention defined in the claims.

For example, the internal combustion engine usable in the present invention includes a variety of engines within the scope of the invention. The saddle-type vehicle is not limited to the two-wheel motorcycle shown and described above but can be any of a variety of three-wheel or four-wheel saddle-type vehicles including buggy cars.

The exhaust gas sensor may be another type of sensor excluding the heater-less oxygen sensor.

The left and right arrangement of various members and parts has been described above in connection with the embodiments shown, the left and right arrangement could be opposite to that described above within the scope of the invention.

The shape of the guide part 80 may be a shape that bulges from the inner wall 76A to guide exhaust gas toward the exhaust gas sensor 7. The guide part 80 may be formed by partly protruding the inner wall 76A or by providing a stepped-shape ridge on the inner wall 76A.

REFERENCE LETTERS

1 . . . Two-wheel motorcycle, 2 . . . Vehicle frame, 3 . . . Power unit, 4 . . . Internal combustion engine, 5 . . . Belt-type continuously variable transmission, 7 . . . Exhaust gas sensor, 7a . . . Sensing tip, 22 . . . Floor pipe, 22a . . . Bent portion, 22b . . . Cross pipe, 30 . . . Crankcase, 31 . . . Crankshaft, 34 . . . Ignition plug, 36 . . . Water pump, 36b . . . Cooling water tube, 42 . . . Cylinder head, 42a . . . Abutting surface, 42d . . . Left side surface, 42e . . . Exhaust gas guide pipe-wall, 42f . . . Exhaust pipe connecting portion, 42g . . . Flange, 42h . . . Recess, 42i . . . Sloping bottom wall, 43 . . . Cylinder head cover, 48 . . . Gasket, 49 . . . Cam chain chamber, 69 . . . Heat insulation space, 70 . . . Exhaust gas sensor fitting hole, 71 . . . Intake port, 72 . . . Exhaust port, 72A . . . Right exhaust port section (First exhaust port section), 72Aa . . . Upstream inlet, 72B . . . Left exhaust port section (Second exhaust port section), 72Ba . . . Upstream inlet, 72C . . . Collective exhaust port section, 72Ca . . . Upstream end, 72Cb . . . Downstream end, 72Co . . . Radially outer region, 73 . . . Intake valve, 74A . . . Right exhaust valve (First exhaust valve), 74B . . . Left exhaust valve (Second exhaust valve), 76A . . . Inner wall (On the side of right exhaust port section 72A), 76Ab . . . Downstream portion of maximum bulging position), 76B . . . Inner wall (On the side of left exhaust port section 72B), 77 . . . Passage center, 80 . . . Guide part, 80a . . . Position of maximum amount of bulging, 80b . . . Bulging slope 80b, 85 . . . Exhaust gas arresting groove, 85a . . . Upstream end, X . . . Cylinder axis X, A . . . First imaginary line, B . . . Axis of exhaust pipe connecting portion 42f, C . . . Passage centerline of collective exhaust port section 72C

The invention claimed is:

1. A fixing structure for an exhaust gas sensor of an internal combustion engine, mounted on a saddle-type vehicle and having a single cylinder with a cylinder axis inclining forward to a substantially horizontal attitude, wherein the engine has a single cylinder head formed therein with a first exhaust port section having an upstream inlet opened and closed by a first exhaust valve, a second exhaust port section having an upstream inlet opened and closed by a second exhaust valve, and a single collective exhaust port section into which the first and second exhaust port sections merge at downstream ends thereof, and wherein the cylinder head has an exhaust gas sensor fixed to a first inner wall portion of the collective exhaust port section, with a sensing tip of the sensor positioned in the collective exhaust port section; wherein:

the collective exhaust port section has a second inner wall portion disposed opposite to the first inner wall portion in an upstream region relative to the exhaust gas sensor, with an exhaust gas guide part bulging out on the second inner wall portion to guide exhaust gas toward the exhaust gas sensor;

the first exhaust port section and the second exhaust port section are disposed in side-by-side arrangement in a transverse direction of the saddle-type vehicle;

the cylinder head has an exhaust gas guide wall defining therein the collective exhaust port section and extending downward from the cylinder head, the exhaust gas guide wall having an exhaust pipe connecting portion at a lowermost part thereof;

the exhaust gas guide wall together with the exhaust gas guide part extend in a direction to be offset to one side of the vehicle in the vehicle transverse direction with respect to said cylinder axis; and the exhaust gas sensor is fixed to the exhaust gas guide wall on the other side of the vehicle in the vehicle transverse direction with respect to said cylinder axis.

2. The fixing structure for an exhaust gas sensor according to claim 1, wherein the exhaust gas sensor is at a position offset toward one of the first exhaust port section and the second exhaust port section with respect to a passage centerline of the collective exhaust port section, and the exhaust gas guide part is at a position opposite the exhaust gas sensor with respect to said passage centerline.

3. The fixing structure for an exhaust gas sensor according to claim 2, wherein the exhaust gas guide part is formed on the second inner wall portion of the collective exhaust port section to bulge in a shape which approaches the exhaust gas sensor from an upstream side to a downstream side, the exhaust gas guide part has a maximum bulging portion bulging out toward the exhaust gas sensor, and the collective exhaust port section has an upstream end positioned upstream of the maximum bulging portion.

4. The fixing structure for an exhaust gas sensor according to claim 3, wherein the first exhaust port section, the second exhaust port section and the collective exhaust port section are formed in an arcuate shape, as viewed in a transverse direction of the engine, and extend from the first and second upstream inlets, facing rearward of the engine, to the downstream end of the collective exhaust port section facing downward of the engine, and the exhaust gas sensor is fixed in an exhaust gas sensor fitting hole, which is located at a position offset in a front direction of the engine relative to the passage centerline of the collective exhaust port section.

5. The fixing structure for an exhaust gas sensor according to claim 4, wherein the first inner wall portion of the collective exhaust port section, on the side of the exhaust gas sensor, is formed with an exhaust gas arresting groove extending along the passage centerline of the collective exhaust port section, in an area opposite the maximum bulging portion of the guide part, and the exhaust gas sensor fitting hole for the sensor is located at a position immediately downstream of the exhaust gas arresting groove.

6. The fixing structure for an exhaust gas sensor according to claim 3, wherein the first inner wall portion of the collective exhaust port section, on the side of the exhaust gas sensor, is formed with an exhaust gas arresting groove extending along the passage centerline of the collective exhaust port section, in an area opposite the maximum bulging portion of the guide part, and an exhaust gas sensor fitting hole for the sensor is located at a position immediately downstream of the exhaust gas arresting groove.

7. The fixing structure for an exhaust gas sensor according to claim 3, wherein the position of the exhaust gas sensor is such that the sensing tip thereof is on a first imaginary line passing through the cylinder axis and through a passage center corresponding to the upstream end of the collective exhaust port section.

8. The fixing structure for an exhaust gas sensor according to claim 7, wherein the first exhaust port section, the second exhaust port section and the collective exhaust port section are formed in an arcuate shape, as viewed in a transverse direction of the engine, and extend from the first and second upstream inlets, facing rearward of the engine, to the downstream end of the collective exhaust port section facing downward of the engine, and the exhaust gas sensor is fixed in an exhaust gas sensor fitting hole, which is located at a position offset in a front direction of the engine relative to the passage centerline of the collective exhaust port section.

9. The fixing structure for an exhaust gas sensor according to claim 7, wherein the first inner wall portion of the collective exhaust port section, on the side of the exhaust gas sensor, is formed with an exhaust gas arresting groove extending along the passage centerline of the collective exhaust port section, in an area opposite the maximum bulging portion of the guide part, and an exhaust gas sensor fitting hole for the sensor is located at a position immediately downstream of the exhaust gas arresting groove.

10. The fixing structure for an exhaust gas sensor according to claim 7, wherein the first inner wall portion of the collective exhaust port section, on the side of the exhaust gas sensor, extends from an upstream side to a downstream side to so slope as to approach the first imaginary line passing through the cylinder axis and the passage center corresponding to the upstream end of the collective exhaust port section.

11. The fixing structure for an exhaust gas sensor according to claim 10, wherein the first exhaust port section, the second exhaust port section and the collective exhaust port section are formed in an arcuate shape, as viewed in a transverse direction of the engine, and extend from the first and second upstream inlets, facing rearward of the engine, to the downstream end of the collective exhaust port section facing downward of the engine, and the exhaust gas sensor is fixed in an exhaust gas sensor fitting hole, which is located at a position offset in a front direction of the engine relative to the passage centerline of the collective exhaust port section.

12. The fixing structure for an exhaust gas sensor according to claim 10, wherein the first inner wall portion of the collective exhaust port section, on the side of the exhaust gas sensor, is formed with an exhaust gas arresting groove extending along the passage centerline of the collective exhaust port section, in an area opposite the maximum bulging portion of the guide part, and an exhaust gas sensor fitting hole for the sensor is located at a position immediately downstream of the exhaust gas arresting groove.

13. The fixing structure for an exhaust gas sensor according to claim 10, wherein the second inner wall portion of the collective exhaust port section, on the opposite side of the exhaust gas sensor, has a downstream portion extending downstream of the maximum bulging portion of the guide part, and the downstream portion is shaped to slope away from the first imaginary line.

14. The fixing structure for an exhaust gas sensor according to claim 13, wherein the first exhaust port section, the second exhaust port section and the collective exhaust port section are formed in an arcuate shape, as viewed in a transverse direction of the engine, and extend from the first and second upstream inlets, facing rearward of the engine, to the downstream end of the collective exhaust port section facing downward of the engine, and the exhaust gas sensor is fixed in an exhaust gas sensor fitting hole, which is located at a position offset in a front direction of the engine relative to the passage centerline of the collective exhaust port section.

15. The fixing structure for an exhaust gas sensor according to claim 13, wherein the first inner wall portion of the collective exhaust port section, on the side of the exhaust gas sensor, is formed with an exhaust gas arresting groove extending along the passage centerline of the collective exhaust port section, in an area opposite the maximum bulging portion of the guide part, and an exhaust gas sensor fitting hole for the sensor is located at a position immediately downstream of the exhaust gas arresting groove.

16. The fixing structure for an exhaust gas sensor according to claim 13, wherein the exhaust pipe connecting portion has an axis shifted in a transverse direction of the vehicle relative to the first imaginary line due to the sloping first inner wall portion of the collective exhaust port section.

17. The fixing structure for an exhaust gas sensor according to claim 16, wherein the first inner wall portion of the collective exhaust port section, on the side of the exhaust gas sensor, is formed with an exhaust gas arresting groove extending along the passage centerline of the collective exhaust port section, in an area opposite the maximum bulging portion of the guide part, and the exhaust gas sensor fitting hole for the sensor is located at a position immediately downstream of the exhaust gas arresting groove.

* * * * *